United States Patent
Fujita et al.

(10) Patent No.: US 10,811,992 B2
(45) Date of Patent: Oct. 20, 2020

(54) POWER CONVERSION DEVICE

(71) Applicant: FUJI ELECTRIC CO., LTD., Kawasaki-shi, Kanagawa (JP)

(72) Inventors: Satoru Fujita, Tachikawa (JP); Ryuji Yamada, Hachioji (JP)

(73) Assignee: FUJI ELECTRIC CO., LTD., Kawasaki-Shi, Kanagawa (JP)

(*) Notice: Subject to any disclaimer, the term of this patent is extended or adjusted under 35 U.S.C. 154(b) by 205 days.

(21) Appl. No.: 16/018,459

(22) Filed: Jun. 26, 2018

(65) Prior Publication Data

US 2019/0068078 A1    Feb. 28, 2019

(30) Foreign Application Priority Data

Aug. 25, 2017   (JP) ................................. 2017-162820

(51) Int. Cl.
| | |
|---|---|
| *H02M 7/217* | (2006.01) |
| *H02M 1/00* | (2006.01) |
| *H02M 1/12* | (2006.01) |
| *H02M 3/155* | (2006.01) |
| *H02M 7/06* | (2006.01) |

(52) U.S. Cl.
CPC ........... *H02M 7/217* (2013.01); *H02M 1/126* (2013.01); *H02M 3/155* (2013.01); *H02M 7/06* (2013.01); *H02M 2001/0074* (2013.01)

(58) Field of Classification Search
CPC ..... H02M 2001/0074; H02M 7/04–25; H02M 5/42–4585; H02M 3/10–1588
See application file for complete search history.

(56) References Cited

U.S. PATENT DOCUMENTS

| | | | |
|---|---|---|---|
| 6,366,483 B1* | 4/2002 | Ma ..................... | H02M 1/4216 363/37 |
| 2014/0153294 A1* | 6/2014 | Deboy ............. | H02M 3/33569 363/21.04 |
| 2014/0266131 A1* | 9/2014 | Deboy ................. | H02M 3/158 323/311 |
| 2015/0372614 A1 | 12/2015 | Yamada | |

(Continued)

FOREIGN PATENT DOCUMENTS

JP      2016-027779 A     2/2016

*Primary Examiner* — Rexford N Barnie
*Assistant Examiner* — David A Shiao
(74) *Attorney, Agent, or Firm* — Rabin & Berdo, P.C.

(57) ABSTRACT

A power conversion device including an alternating current (AC) source, a plurality of switching units connected in series between positive and negative terminals of the AC source, each including a semiconductor switching element and having a load connected thereto, each switching unit outputting, to the load connected thereto, an input current from the AC source and a direct current (DC) output voltage that is generated through ON/OFF control of the semiconductor switching elements, a capacitor connected in parallel with the AC source and with the switching units, an inductor inserted between the capacitor and the switching units, and between the AC source and the switching units, a current measurement unit that measures a value of a current flowing from the AC source to the capacitor, and a control device that performs the ON/OFF control on the semiconductor switching elements on the basis of the measured current value.

12 Claims, 7 Drawing Sheets

(56) References Cited

U.S. PATENT DOCUMENTS

| | | | |
|---|---|---|---|
| 2016/0072397 A1* | 3/2016 | Deboy | H02M 3/33592 |
| | | | 363/21.1 |
| 2016/0079881 A1* | 3/2016 | Barbosa | H02M 7/23 |
| | | | 307/11 |
| 2016/0301305 A1 | 10/2016 | Yamada | |
| 2017/0099008 A1* | 4/2017 | Keister | H02M 1/08 |
| 2017/0222545 A1* | 8/2017 | Haga | H02M 1/08 |
| 2018/0159424 A1* | 6/2018 | Kolar | H02M 1/36 |

\* cited by examiner

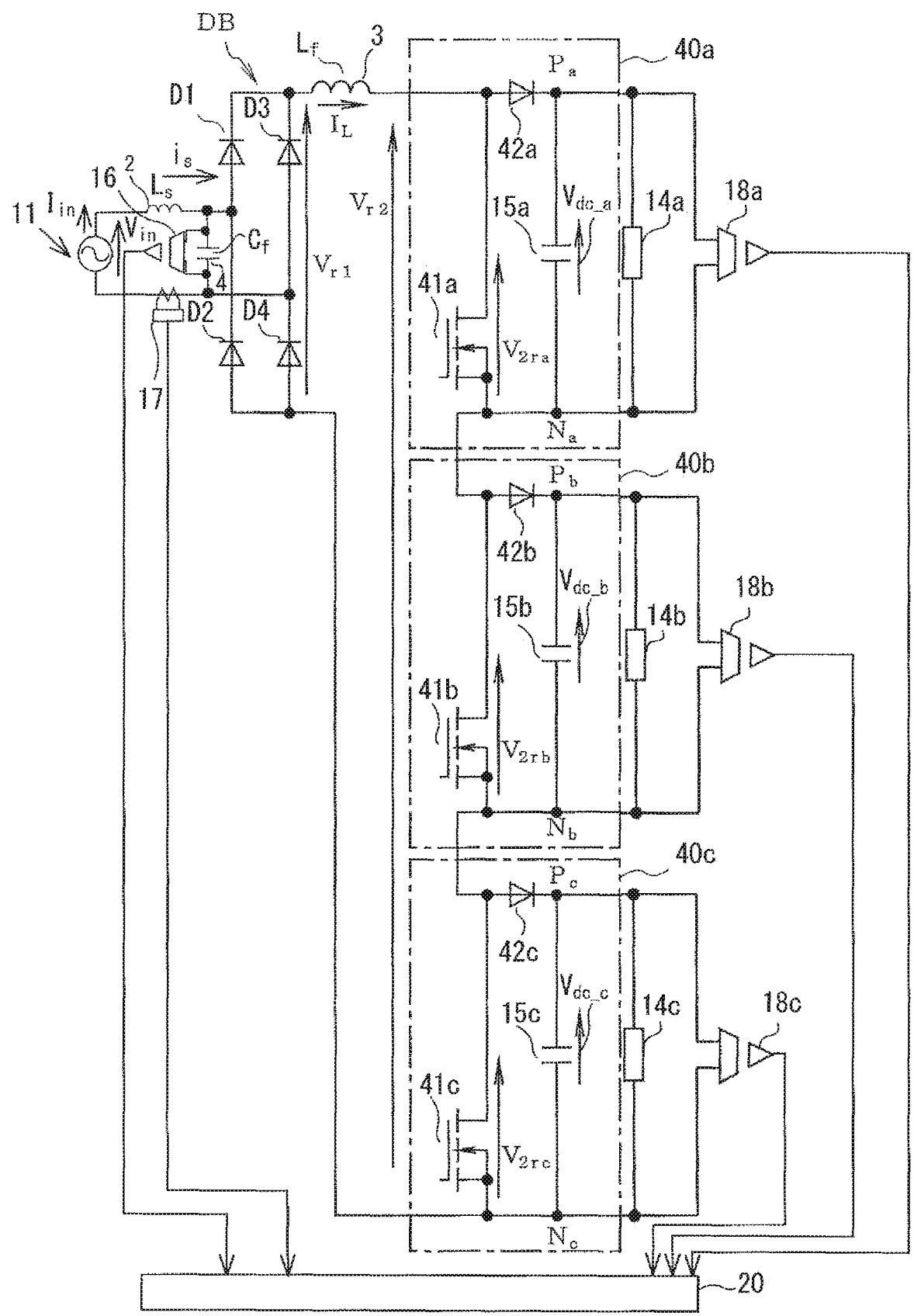
F I G. 3

POWER CONVERSION DEVICE

CROSS-REFERENCE TO RELATED APPLICATION

This application is based upon and claims the benefit of priority from the prior Japanese Patent Application No. 2017-162820 filed on Aug. 25, 2017, the entire contents of which are incorporated herein by reference.

TECHNICAL FIELD

The present invention is related to a power conversion device that converts AC (alternating current) power into DC (direct current) power.

BACKGROUND

As a power conversion device that converts AC power into DC power, the technique of Japanese Laid-open Patent Publication No. 2016-27779 (hereinafter "Patent Document 1") for example is known.

The invention of Patent Document 1 is an AC-DC conversion device, is related to a single-phase PWM (pulse-width modulation) converter, and includes, as an example, a configuration of, in particular, a combination of a single-phase full wave rectification circuit and a boost-type DC-DC conversion device (chopper) in which, by controlling the value of a current flowing into the chopper, the waveform of an input current flowing from the power source is changed to a sinusoidal waveform of a unity power factor.

Patent Document 1 discloses a configuration in which a plurality of switching units each of which constitutes an AC-DC converter are connected in series and loads are separately connected between the output terminals of the respective switching units (multi-level circuit).

The above configuration makes it possible to respond to a high AC input voltage. Also, as described in paragraph [0050] of Patent Document 1, even when the capacity of a reactor is reduced so as to achieve a reduction in size, ripples contained in current $I_L$ can be suppressed sufficiently.

FIG. 1 illustrates a configuration example of a conventional multi-level circuit.

In a power conversion circuit (multi-cell converter) 100 illustrated in the figure, a plurality of AC-DC converters 104c, 104b and 104c are connected in series between the positive terminal and the negative terminal of an AC source 110, and loads 105a, 105b and 105c are connected to the AC-DC converters 104a, 104b and 104c, respectively. The power conversion circuit 100 includes an AC inductor (reactor) 103 and an AC filter capacitor 104 that constitute an LC filter for an input from a system. The AC inductor 103 in the figure corresponds to the above reactor.

Also, the power conversion circuit 100 generates a DC voltage to be supplied to each of the loads 105a through 105c, on the basis of the AC source 110. The system from the AC source 110 to the power conversion circuit 100 (particularly an AC filter capacitor 104, which is an input terminal thereof) includes an inductance component, which will be referred to as a system impedance 111.

As illustrated in the figure, a current from the AC source 110 is input to a group of the AC-DC converters 104a through 104c via the system impedance 111 and the AC inductor (such as a reactor 6 in Patent Document 1) 103. Between the input terminal side of the AC inductor 103 and the negative side of the AC source 110, the AC filter capacitor 104 is connected. The AC inductor 103 and the AC filter capacitor 104 constitute the LC filter (AC filter).

Because the capacity of the AC inductor 103 (inductance value Lf) can be reduced so as to achieve a reduction in size, as described above, the AC filters (103, 104) can be reduced in size.

In Patent Document 1, an output voltage of a conversion circuit is controlled by using a method such as PWM etc., so that a voltage applied to the reactor (i.e., reactor 6 in Patent Document 1) is changed, $di_L/dt$ (derivative value of current $I_L$) that is thus obtained is used, and thereby control is performed in such a manner that the current (current $I_L$ in Patent Document 1) is increased or decreased to a desired value. Note that current $I_L$ is a current flowing through the reactor 6.

Therefore, when an AC filter is small as described above, the current control easily becomes unstable. In other words, when inductance value Lf of the AC inductor 103 is low, $di_L/dt$ above, i.e., the gain of the control system, becomes too high, making the current control easily become unstable.

Specifically, the following expression is satisfied as a general rule, where Lf is the inductance value of the reactor 6 and V is the voltage applied to the reactor 6.

$$V = Lf \times (di_L/dt)$$

As is obvious from this relational expression, when the value of Lf is low, $(di_L/dt)$ becomes greater in response to a small change in the value of V (the inclination of the increase/decrease of $I_L$ becomes greater; current derivation becomes greater), making the current control easily become unstable.

Further, system impedance value Ls also influences the stability of the above current control. Specifically, in the circuit illustrated in FIG. 1, because the inductance value Lf of the AC inductor 103 can be made lower as described above, the value of LF sometimes becomes lower than the value of Ls, and when current control is performed by using current $I_L$ in such a case, the control sometimes becomes unstable.

While using a multi-level circuit makes it possible to use a small LC filter (AC filter) as described above, the current control sometimes becomes unstable when an inductance value of a reactor (AC inductor) is low.

SUMMARY

The present invention provides a power conversion device that can prevent input current control from becoming unstable even when the inductance value of an inductor is made lower in a power conversion device having a multi-level circuit and an input LC filter.

The power conversion devices of the present invention have the constituents described below.

A plurality of switching units that are connected in series between a positive terminal and a negative terminal of an AC source and that output, to loads, an input current that is from the AC source and a DC output voltage that is generated through ON/OFF control of semiconductor switching elements, the loads being connected to the respective switching units A capacitor that is connected in parallel between the AC source and the plurality of switching units and an inductor that is inserted at a position and that constitutes an input filter together with the capacitor, the position being between the capacitor and the plurality of switching units and between the AC source and the plurality of switching units A first-current measurement unit that measures a first-current measurement value, which is a value of a current flowing through a system from the AC source to the capacitor A control device that performs ON/OFF control on the respective semiconductor switching elements on the basis of the first-current measurement value The present invention includes a control unit that treats, as an input, a current in a filter and an AC-DC converter output voltage for a control-target circuit unit including an LC filter unit treating, as an input, an AC voltage $V_{in}$ of an input and a series AC-DC converter unit, and that feeds back the current in the filter. Such a control system sometimes becomes unstable depending upon the gain of a loop gain formed by a feedback system and the size of a phase. For example, when the locus of a loop gain on a complex number plane passes on the left side of a point (−1+jo) on the complex number plane, such a control system becomes unstable. When the locus passes on the right side, the control is considered to be stable, i.e., to have a gain margin and a phase margin. In the present invention, a case in which there is a gain margin is defined as a stable case and a case in which there is not a gain margin is defined as an unstable case.

While one terminal of an LC filter is connected to the input side, the other terminal is input to the AC-DC converter. Depending upon switching, voltage $V_{r2}$ of the other terminal changes in a pulsed manner. Because a changing component di/dt of output current $I_L$ of an LC filter is a variable related to a loop gain of a feedback control system, the magnitude of that changing component influences the stability of the system.

The present invention stabilizes a system by selecting a current in an LC filter having a low value of an element within a scope where there is a gain margin of the system.

BRIEF DESCRIPTION OF DRAWINGS

FIG. 3 illustrates a detailed configuration example of the circuit unit illustrated in FIG. 2;

DESCRIPTION OF EMBODIMENTS

Figure 1:
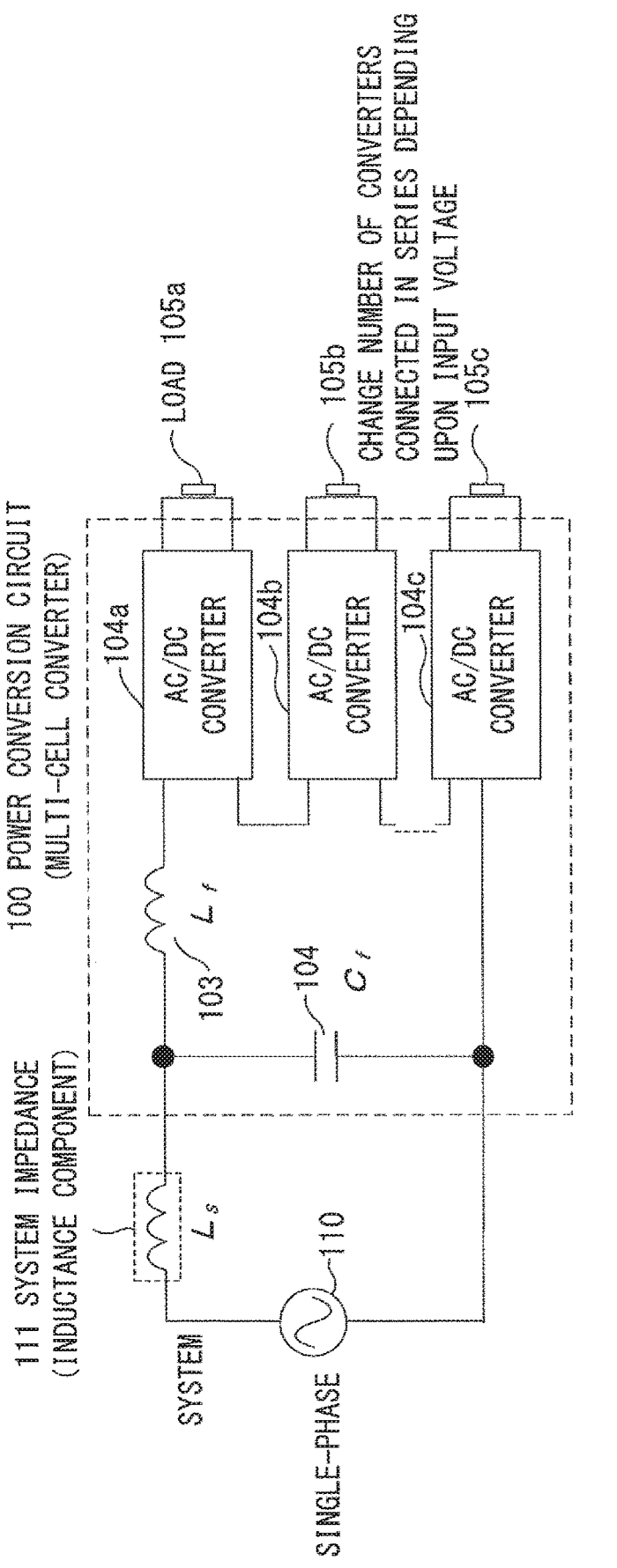
FIG. 1 illustrates a configuration example of a conventional AC-DC conversion device.

Hereinafter, the embodiments of the present invention will be explained by referring to the drawings.

Figure 2:
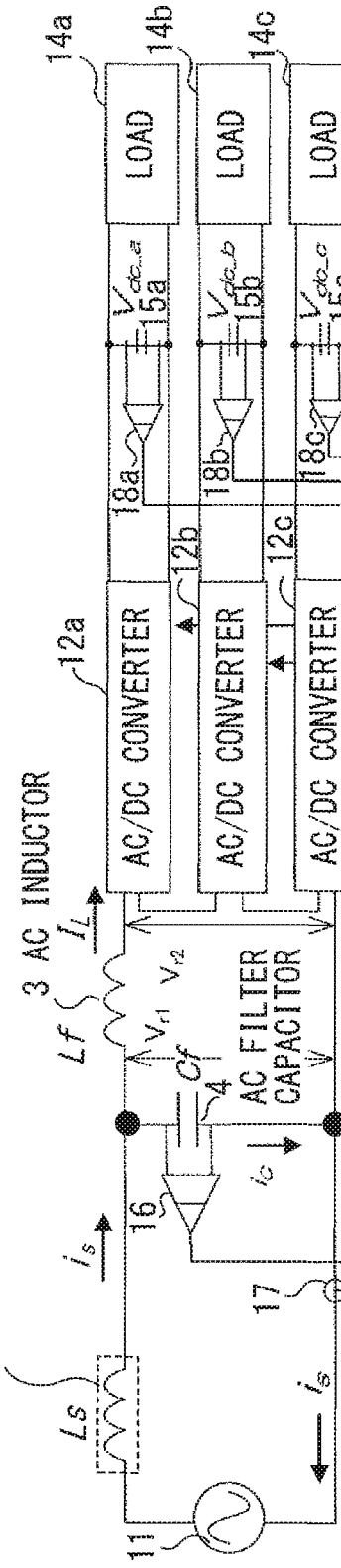
FIG. 2 illustrates a configuration example of an AC-DC conversion device according to example 1.

FIG. 2 illustrates a configuration example of a power conversion device (AC-DC conversion device) according to example 1.

Note that while an AC-DC conversion device of the present example is also related to a single-phase PWM converter, and is based on a configuration of, particularly, a combination between a single-phase full wave rectification circuit and a boost-type DC-DC conversion device (chopper), in which by controlling the value of a current flowing into the chopper, the waveform of an input current flowing from the power source is changed to a sinusoidal waveform of a unity power factor, the present example is not limited to this example.

Conventionally, a DC-DC converter has generally used at least one semiconductor switch for power (such as an insulated-gate bipolar transistor (IGBT) etc.), and by performing ON/OFF control on this switch, the output voltage can be adjusted to a desired value even when input voltages or loads vary.

The AC-DC conversion device (power conversion device) illustrated in the figure schematically includes a circuit unit 10 and a control unit 20.

The circuit unit 10 includes an AC source 11, an AC inductor (reactor) 3, an AC filter capacitor 4, a plurality (for instance three in this example) of AC-DC converters 12a, 12b and 12c, a gate drive circuit 19, etc.

It is assumed that the inductance value of the AC inductor (reactor) 3 is Lf and the capacity of the AC filter capacitor 4 is Cf.

The plurality of AC-DC converters 12a, 12b and 12c are connected in series. Also, loads 14a, 14b and 14c are connected to the output terminals of the AC-DC converters 12a, 12b and 12c, respectively. Also, capacitors 15a, 15b and 15c are connected in parallel to the loads 14a, 14b and 14c, respectively. The end voltages (Vdc_a, Vdc_b and Vdc_c) of the capacitors 15a, 15b and 15c serve as DC output voltages to their corresponding loads 14a, 14b and 14c.

Note that when it is not necessary to treat the above plurality of constituents separately, they will be referred to as for example the AC-DC converter 12, the load 14, the capacitor 15, etc. This rule also applies to a case where there are a plurality of identical constituents. Also, the AC source 11 is a single-phase AC power source.

Also, the AC inductor 3 and the AC filter capacitor 4 constitute an input LC filter (AC filter) for an input from the AC source 11.

Also, each of the AC-DC converters 12a, 12b and 12c includes general circuit constituents (switching element, diode, etc.), although they are not illustrated particularly. The above gate drive circuit 19 performs ON/OFF control on the above switching element (not illustrated) in accordance with control signals Go_a, Go_b and Go_c from the control unit 20. While a MOSFET (metal-oxide-semiconductor field-effect transistor) for example is used as a switching element, the scope of the present invention is not limited to this example, and an IGBT (insulated-gate bipolar transistor), a BJT (bipolar junction transistor), etc. may be used. Also, although not illustrated particularly, the circuit unit includes a rectifier circuit as well.

Also, the system from the AC source 11 to the above AC filter capacitor 4 includes the illustrated impedance 2. It is assumed in this example that the system impedance 2 is an inductance component based on the length of the wire, a leakage inductance of a transformer, etc., and this inductance value is denoted by Ls.

It is assumed that a current flowing through this system impedance 2 (a current flowing on the system side of the AC filter capacitor 4) is denoted by $i_s$ and a current flowing through the above AC inductor 3 is denoted by $I_L$. It is further assumed that a current flowing through the AC filter capacitor 4 is denoted by $i_c$. Further, it can be considered that $i_s = I_L + i_c$ is satisfied.

Also, a voltmeter 16 that detects voltage Vs applied to the AC filter capacitor 4 is included. Also, an ammeter 17 that measures the value of current $i_s$ above is included. Further, a voltmeter 18a that measures end voltage (DC output voltage) Vdc_a of the above capacitor 15a, a voltmeter 18b that measures end voltage Vdc_b of the capacitor 15b, and a voltmeter 18c that measures end voltage Vdc_c of the capacitor 15c are included.

Note that while the present example explains a case in which the value of voltage Vs above is used, the scope of the present invention is not limited to this example and the value of voltage $V_{in}$ of the AC source 11 may be used instead of Vs.

The detection values of the above respective voltages and currents, i.e., the respective measurement values of current $i_s$, voltage Vs, voltage Vdc_a, voltage Vdc_b, and voltage Vdc_c are input to the control unit 20. On the basis of these input values etc., the control unit 20 performs ON/OFF control of the above switching elements (not illustrated).

FIG. 3 illustrates a detailed configuration example of the circuit unit 10 illustrated in FIG. 2.

Figure 6:
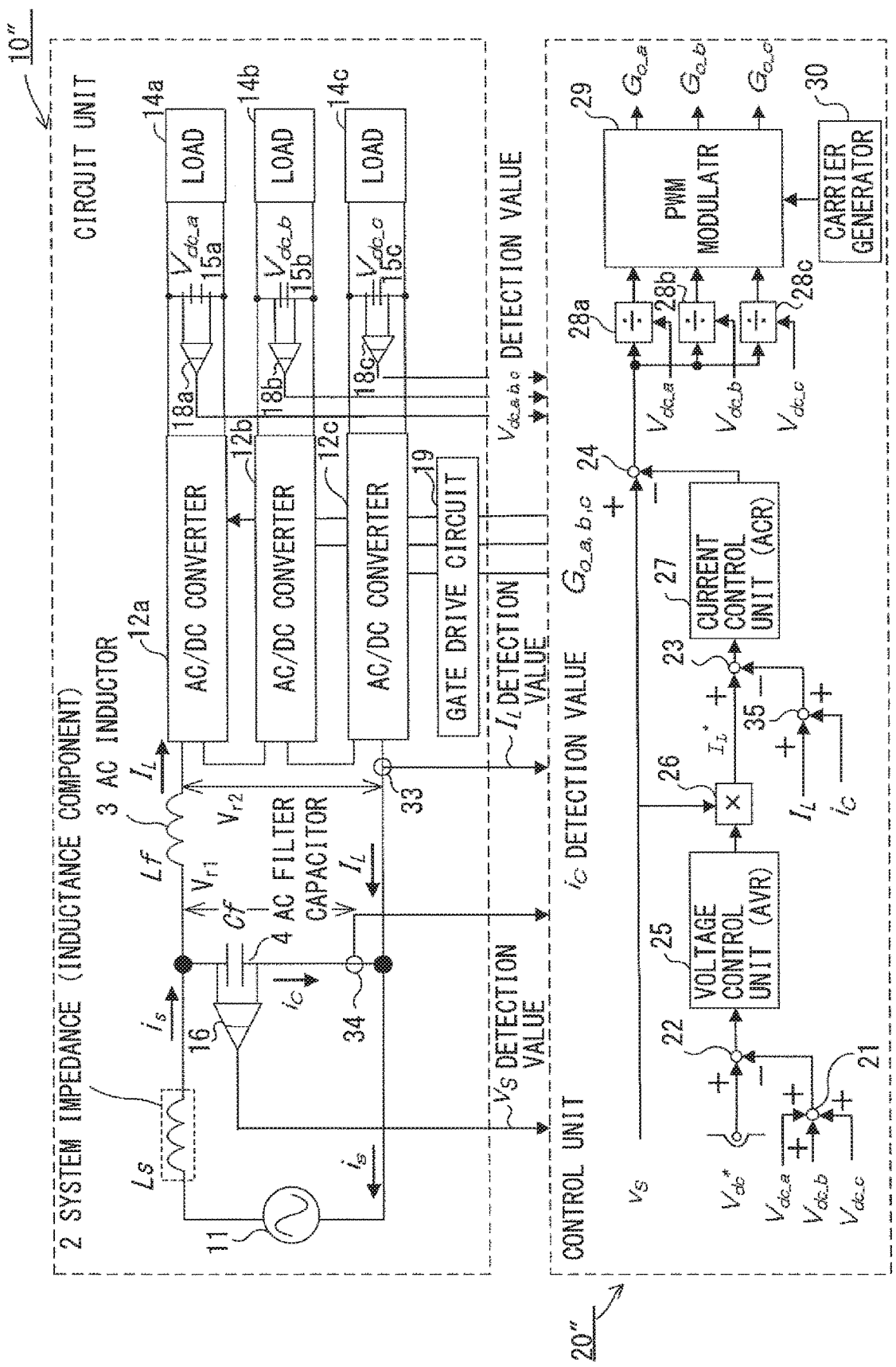
FIG. 6 illustrates a configuration example of an AC-DC conversion device according to example 3.
Figure 7:
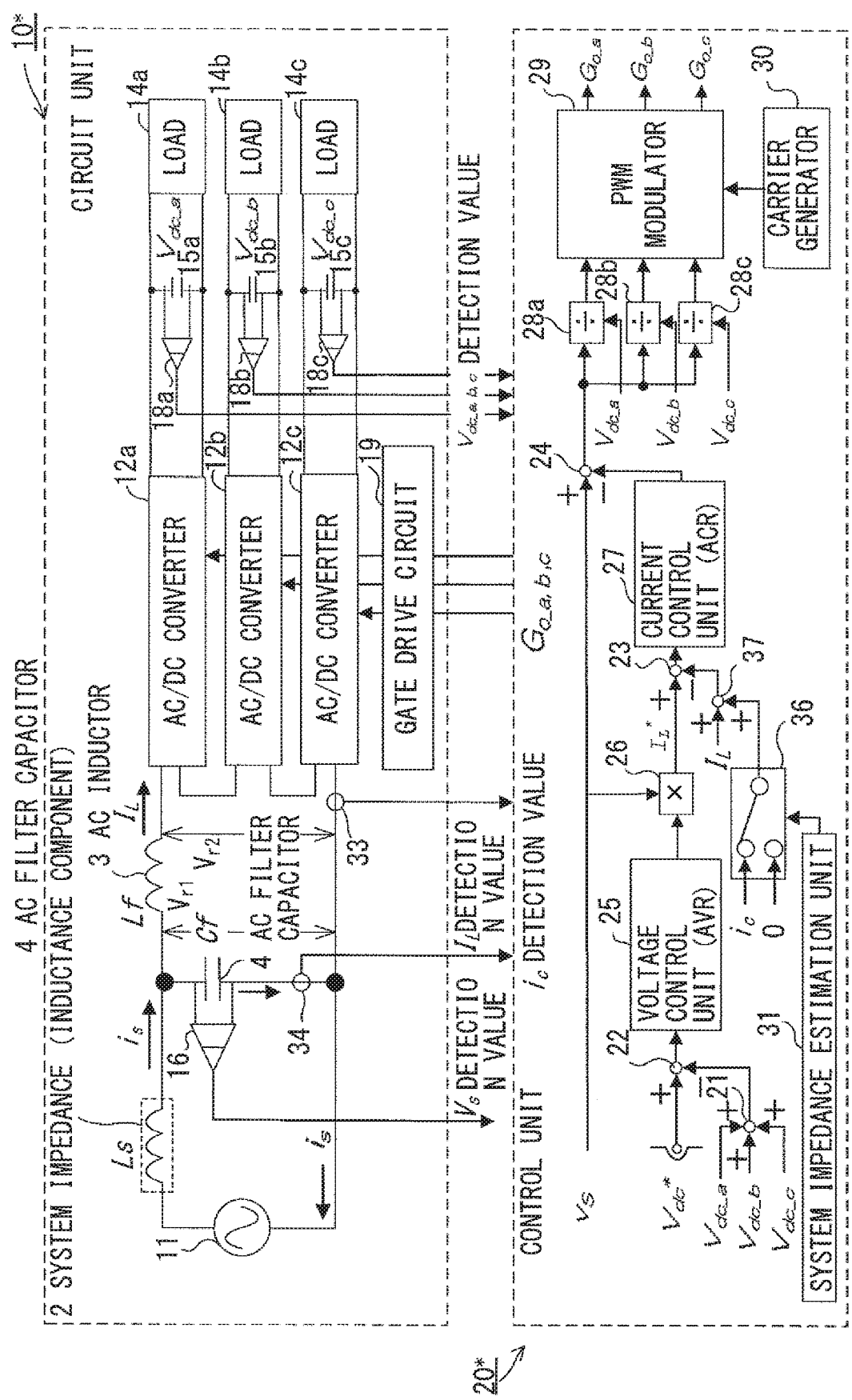
FIG. 7 illustrates a configuration example of an AC-DC conversion device according to example 4.

Note that while FIG. 2 illustrates a configuration in which each of the plurality of AC-DC converters 12a through 12c has a rectification circuit (diode bridge) and a switching unit, i.e., a configuration corresponding to for example FIG. 6 of Patent Document 1, FIG. 3 illustrates a configuration corresponding to FIG. 1 and FIG. 7 of Patent Document 1. The control unit 20 uses control methods that are substantially similar between the above configurations. In other words, a configuration in which a rectification circuit (diode bridge) is separately provided to each of the switching units as illustrated in FIG. 6 of Patent Document 1 and a configuration using a control method that is substantially similar to the control method for the configuration of FIG. 1 of Patent Document 1, which will be explained later, are both possible.

Note that in FIG. 3, the same symbols are given to the same components as those illustrated in FIG. 2. In other words, as illustrated in the figure, the AC source 11, the AC inductor 3, the AC filter capacitor 4, the respective loads 14a, 14b and 14c, the capacitors 15a, 15b and 15c, the system impedance 2, the voltmeter 16, the ammeter 17, and the voltmeters 18a, 18b and 18c are denoted by the same symbols as those in FIG. 2.

In FIG. 3, rectification circuit DB (diode bridge) including diodes D1, D2, D3 and D4 is connected to both ends of the above AC source 11. The AC filter capacitor 4 is connected between the positive input terminal and the negative input terminal of rectification circuit DB. A path from the AC source 11 to the AC filter capacitor 4 includes the above inductance component (the system impedance 2).

One of the ends of the AC inductor (reactor) 3 is connected to the positive output terminal of rectification circuit DB. Between the other end of the AC inductor 3 and the negative output terminal of rectification circuit DB, a plurality (three in this example) of semiconductor switching elements 41a, 41b and 41c are connected in series.

Between the source and the drain of the semiconductor switching element 41a, a series connection of the diode 42a and the above capacitor 15a is connected in parallel. The above load 14a is connected to the capacitor 15a in parallel. Similarly, between the drain and the source of the semiconductor switching element 41b, a series connection of the diode 42b and the above capacitor 15b is connected in parallel. The above load 14b is connected to the capacitor 15b in parallel. Between the drain and the source of the semiconductor switching element 41c, a series connection of the diode 42c and the above capacitor 15c is connected in parallel. The above load 14c is connected to the capacitor 15c in parallel.

It is assumed in this example that the semiconductor switching element 41a, the diode 42a, and the capacitor 15a constitute a first switching unit 40a, as illustrated in the figure. Similarly, it is assumed that the semiconductor switching element 41b, the diode 42b, and the capacitor 15b constitute a second switching unit 40b. It is assumed that the semiconductor switching element 41c, the diode 42c and the capacitor 15c constitute a third switching unit 40c. In such a case, it can be considered that a plurality (three in this example) of switching units 40a, 40b and 40c are connected in series between the other end of the above AC inductor 3 and the negative output terminal of rectification circuit DB.

Note in the figure that Pa, Pb and Pc denote the positive electrodes of the capacitors 15a, 15b and 15c, and Na, Nb and Nc denote the negative electrodes of the capacitors 15a, 15b and 15c. It is assumed in this example that while the capacitors 15a, 15b and 15c have equal capacity values, the scope of the present invention is not limited to this example.

Also, it is assumed in this explanation that a forward voltage drop of the semiconductor switching elements 41a, 41b and 41c and the diodes 42a, 42b and 42c is ignored.

In the above configuration, because voltage $V_{r2}$ in the figure is equal to a result of adding voltages Vdc_a, Vdc_b and Vdc_c, any of voltages Vdc_a, Vdc_b and Vdc_c may be a value that is ⅓ of $V_{r2}$. In other words, a device with a withstand voltage corresponding to a value that is ⅓ of $V_{r2}$ can be used for the semiconductor switching elements 41a, 41b and 41c and the diodes 42a, 42b and 42c.

Note that the potential of negative electrode Nb in the switching unit 40b is equal to the potential of negative electrode Nc in a case when the semiconductor switching element 41c in the switching unit 40c is in an ON state, and is equal to the potential of positive electrode Pc in a case when the semiconductor switching element 41c is in an OFF state. In other words, because the potential of one end of the load 14b varies due to the influence of switching of the switching unit 40c, it is desirable that each of the loads 14a, 14b and 14c be independent in terms of potential.

In FIG. 3, $V_{in}$ is an AC input voltage, $I_{in}$ is an AC input current, $I_L$ is a current flowing through the AC inductor (reactor) 3, $V_{r1}$ is an output voltage of rectification circuit DB and $V_{r2}$ is a voltage between the three switching units 40.

Hereinafter, explanations will be given for the control unit 20 that is used for controlling the circuit unit 10 having the above configuration.

In the example illustrated in the figure, the control unit 20 includes an adder 21, a plurality of adder-subtractors 22, 23 and 24, a voltage control unit (AVR) 25, a multiplier 26, and a current control unit (ACR) 27. The control unit 20 further includes a plurality (three) of dividers 28a, 28b and 28c respectively corresponding to the semiconductor switching elements 41a, 41b and 41c. The control unit 20 further includes a PWM modulator 29 and a carrier generator 30. Each of the adder-subtractors 22, 23 and 24 uses its one end as a positive input and the other end as a negative input, and thereby subtracts, from a value input to the one end, a value input to the other end (obtains a difference between two input values).

Also, various types of measurement values from the above various types of measurement units, i.e., DC output voltages Vdc_a, Vdc_b and Vdc_c, the measurement value of voltage Vs applied to the AC filter capacitor 4, and the measurement value of current $i_s$ flowing through system impedance Ls are input to the control unit 20. Note that an absolute value is input as voltage Vs, although this is not illustrated particularly. Also, Vdc*, which is a target value (command value) for Vdc that is a total value of DC output voltages Vdc_a, Vdc_b and Vdc_c, is also input to the control unit 20.

The control unit 20 having this configuration operates for example as below.

The above adder 21 is a constituent for obtaining a total value of output voltages Vdc_a, Vdc_b and Vdc_c of each group. In the control unit 20, control is performed in such a manner that a total value of Vdc_a, Vdc_b and Vdc_c is equal to command value Vdc*. In other words, the adder 21 and the adder-subtractor 22 first obtain a difference (deviation) between command value Vdc* and a total value Vdc of Vdc_a, Vdc_b and Vdc_c, and the obtained difference (deviation) is input to the voltage control unit 25.

The voltage control unit 25 generates/outputs an amplitude command value of current $I_L$ on the basis of the above input. The voltage control unit 25 operates in such a manner that an amplitude command of current $I_L$ is increased when voltage Vdc is insufficient with respect to command value Vdc* and an amplitude command of current $I_L$ is decreased when voltage Vdc is excessive with respect to command value Vdc*. A PI (proportional/integral) regulator for example is used for this voltage control unit 25. The voltage control unit 25 is for example an AVR (automatic voltage regulator) etc.

An amplitude command of current $I_L$ output from the above voltage control unit 25 and voltage Vs that is input are multiplied by the multiplier 26 as described above to obtain instantaneous value command $I_L^*$ of current $I_L$. A deviation between this instantaneous value command $I_L^*$ of current $I_L$ and the value of current $i_s$ flowing through system impedance Ls above is obtained by using the adder-subtractor 23, and this deviation is input to the current control unit 27 (ACR).

According to Patent Document 1 above, a deviation between instantaneous value command $I_L^*$ of current $I_L$ and current $I_L$ is input to the ACR. In the present method, by contrast, a deviation between instantaneous value command $I_L^*$ of current $I_L$ and current $i_s$ is input to the ACR as described above.

In this example, it is possible to consider that current $I_L$ above corresponds to Lf. Meanwhile, it is possible to consider that current $i_s$ corresponds to "Lf+Ls" when the AC filter capacitor 4 does not exist, and even when the AC filter capacitor 4 exists, current $i_s$ is influenced by the value of "Lf+Ls". Also, as described above, in general voltage V=inductance value L×(di/dt) is satisfied and di/dt is a gain of a control system. As described above, when the value of Lf is low, gain (di/dt) becomes too high, often leading to instability. Accordingly, particularly when "Ls>Lf" is satisfied, because a gain corresponding to "Lf+Ls" is relatively low, it operates relatively stably. In other words, because when the value of Lf is low, ($di_L$/dt) becomes great in response to a small change in a voltage applied to the AC inductor (reactor) 3 (because the current derivation (inclination) becomes great; because a change in a current per unit time becomes greater), when current $I_L$ is input to the above adder-subtractor 23 instead of current $i_s$, the output (the level at which the input of the current control unit 27 (ACR) varies) of the adder-subtractor 23 becomes greater. This makes the control easily become unstable. Current $i_s$ has a lower level of variation (current derivation (inclination)) than that of this current $I_L$, leading to a relatively stable operation. As a matter of course, current $i_s$ does not always have a lower level of variation (current derivation (inclination)) than that of current $I_L$, and thus it is also possible to employ the configuration of example 2, which will be described later. Therefore, it is also possible to consider that example 2, which will be explained later, uses the current having the lower level of variation between current $i_s$ and current $I_L$ (the current with the smaller current derivation (inclination)) for feedback control (as an input of the adder-subtractor 23).

Note that the above stable operation includes the ability to prevent oscillation due to an LC filter.

The current control unit 27 operates in such a manner that when current $i_s$ is insufficient with respect to instantaneous value command $I_L^*$, the output thereof is increased, and when current $i_s$ is excessive with respect to instantaneous value command $I_L^*$, the output thereof is decreased. For example a P (proportional) regulator is used for this current control unit 27.

Next, a difference between an output of the current control unit 27 and voltage Vs, i.e., the instantaneous value command of voltage $V_{r2}$, is obtained by using the adder-subtractor 24. The instantaneous value command of voltage $V_{r2}$ decreases when current $i_s$ is insufficient and an output of the current control unit 27 is great, and in such a case, the difference voltage between $V_{r1}$ and $V_{r2}$ becomes higher and a higher current flows to the switching element 41 side.

An output of the adder-subtractor 24 (instantaneous value command of voltage $V_{r2}$) is input to each of the plurality (three) of dividers 28a, 28b and 28c. Each of the dividers 28a, 28b and 28c divides the instantaneous value command of voltage $V_{r2}$ by a value obtained by normalizing Vdc_a, Vdc_b or Vdc_c (a value that is "1.0" when Vdc_a, Vdc_b, Vdc_c=E/3 is satisfied). Voltages Vdc_a, Vdc_b and Vdc_c are attempted to be equalized by separately controlling the switching elements 41a, 41b and 41c by using outputs of these dividers 28a, 28b and 28c as signal waves.

As described above, when values that are in proportion to the inverse numbers of DC output voltages Vdc_a, Vdc_b and Vdc_c are multiplied by an output of the adder-subtractor 24 (the instantaneous value command of voltage $V_{r2}$) it is possible to separately generate signal waves Go_a, Go_b and Go_c for the respective switching units 40a, 40b and 40c.

In other words, outputs (results of the division) of the above respective dividers 28a, 28b and 28c are input to the PWM modulator 29. To the PWM modulator 29, an output from the carrier generator 30, which generates a triangular wave, is also input. The PWM modulator 29 uses a triangular wave carrier from the carrier generator 30 to perform PWM (pulse-width modulation) control on each of the outputs from the above dividers 28a, 28b and 28c, and thereby generates gate signals Go_a, Go_b and Go_c respectively of the above respective switching elements 41a, 41b and 41c.

These respective gate signals Go_a, Go_b and Go_c are input to the gate drive circuit 19. In response to Go_a, Go_b and Go_c, the gate drive circuit 19 performs ON/OFF control on the respective switching elements 41a, 41b and 41c.

Note that the functions of the above dividers 28a, 28b and 28c may be similar to those of the dividers 110a, 110b and 110c in Patent Document 1, and will not be explained herein particularly.

Note that the gate drive circuit 19 is for example an insulation digital signal transmission unit etc. that insulates an ON/OFF command signal from the control device 20 and supplies the signals to the gates of the switching elements 41a, 41b and 41c.

Figure 4:
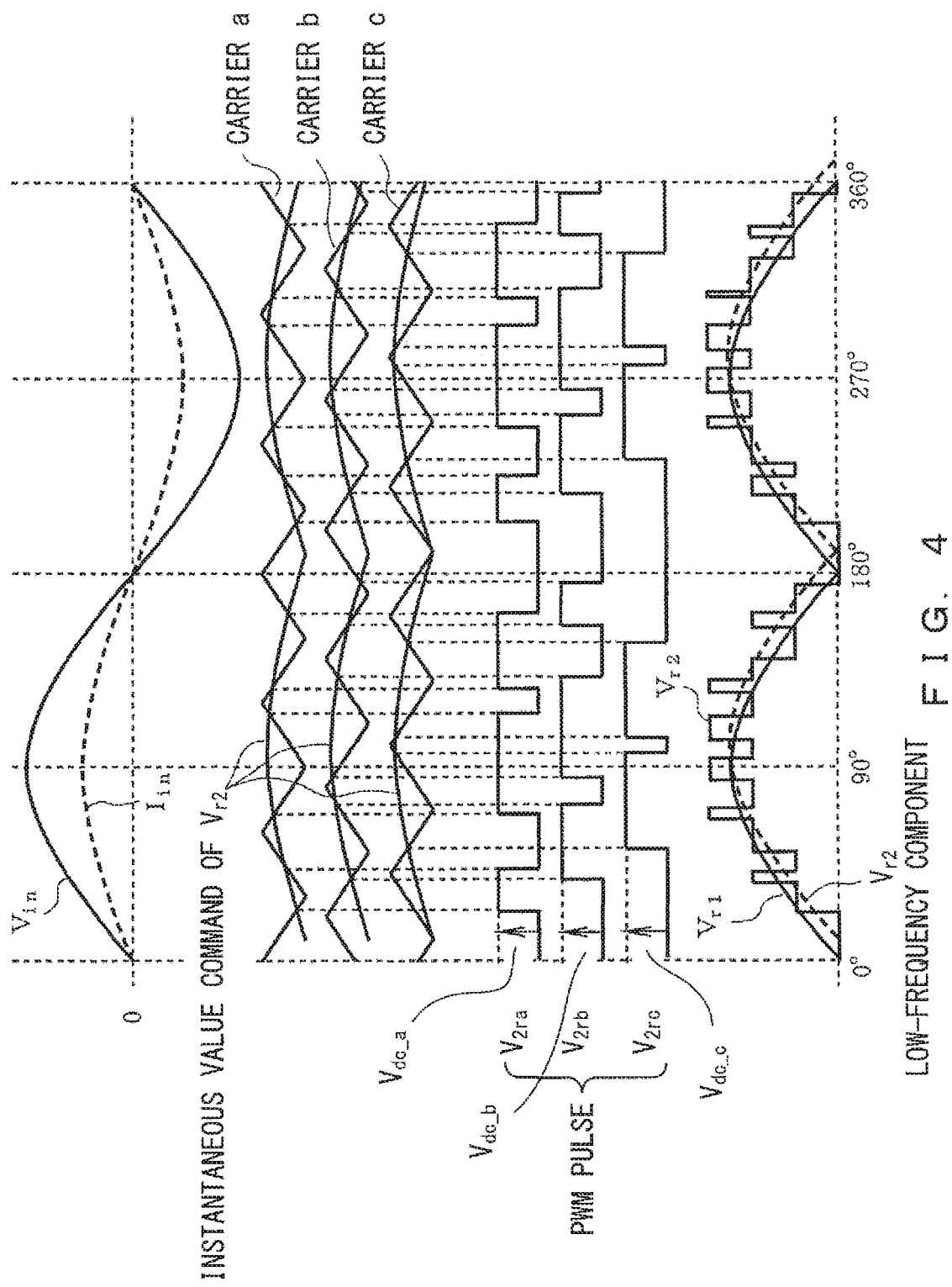
FIG. 4 illustrates an example of a control operation performed by a PWM modulator.

The PWM modulator 29 and the carrier generator 30 employ existing configurations, and will not be explained particularly in detail; however three carrier generators 30 may be provided respectively corresponding to the above three switching units 40a, 40b and 40c, and for example the carrier generators 113a, 113b and 113c illustrated in FIG. 4 of Patent Document 1 may be provided. Also, the PWM modulator 29 and the carrier generator 30 may employ for example configurations illustrated in FIG. 4 of Patent Document 1 (three sets including a set of the carrier generator 113a, the adder 105a, the comparator 111a and the logical inverter 112a, a set of the carrier generator 113b, the adder 105b, the comparator 111b and the logical inverter 112b, and a set of the carrier generator 113c, the adder 105c, the comparator 111c and the logical inverter 112c).

When the above first set is explained as an example, the instantaneous value command of voltage $V_{r2}$ is treated as a signal wave and this signal wave is compared, in the adder 105a and the comparator 111a, with a triangular wave carrier output from the carrier generator 113a, and thereby PWM (pulse-width modulation) control is performed, although this is not explained in detail particularly. Then, the output from the comparator 111a is input to the logical inverter 112a, and gate signal Go_a of the switching element 41a is generated.

Note that the present invention is applied not only to a multi-cell configuration (an example of a multi-level circuit) as illustrated in FIG. 3 but also to a multi-level circuit of a different configuration (such as for example a multi-level inverter disclosed by Japanese Laid-open Patent Publication No. 2006-271042).

FIG. 4 illustrates an example of a control operation performed by the PWM modulator 29.

In the example illustrated in FIG. 4, while carriers a, b and c (illustrated) generated by the above carrier generators 113a, 113b and 113c (not illustrated) all have the same frequency, a phase difference is given to each of carriers a, b and c. In this example, because there are three groups of the switching units 40a, 40b and 40c, the phase difference of each of carriers a, b and c is 360[°]/3=120[°] in electric angle. Examples of instantaneous value commands of $V_{r2}$ for respective carriers a, b and c are illustrated.

Note that while FIG. 4 illustrates an instantaneous value command of $V_{r2}$ for each of carriers a, b and c, this is for facilitating the understanding, and in actuality, a single instantaneous value command of $V_{r2}$ is input to the three dividers 28a, 28b and 28c, and respective carriers a, b and c are applied respectively after the above processes in the respective dividers 28a, 28b and 28c.

Also, $V_{2ra}$, $V_{2rb}$ and $V_{2rc}$ in FIG. 4 are input voltages of the switching units 40a, 40b and 40c in FIG. 3, and are equivalent to the PWM pulses of the switching elements 41a, 41b and 41c. It is possible to consider that the ON/OFF waveforms of PWM pulses $V_{2ra}$, $V_{2rb}$ and $V_{2rc}$ in the figure represent the ON/OFF waveforms of gate signals Go_a, Go_b and Go_c and thus that they represent the ON/OFF waveforms of DC output voltages Vdc_a, Vdc_b and Vdc_c above.

As described above, because voltage $V_{r2}$ is a result of adding DC output voltages Vdc_a, Vdc_b and Vdc_c, voltage $V_{r2}$ becomes a maximum value when DC output voltages Vdc_a, Vdc_b and Vdc_c are all in an ON state, becomes ⅔ of the maximum value when one of the DC output voltages is in an OFF state, and becomes ⅓ of the maximum value when two of the DC output voltages are in an OFF state, as illustrated in a lower portion of FIG. 4. Note that voltage $V_{r2}$ becomes "0" when DC output voltages Vdc_a, Vdc_b and Vdc_c are all in an OFF state.

As described above, voltage $V_{r2}$ takes a waveform that is similar to that of voltage $V_{r1}$ and that is somewhat different from that of $V_{r1}$ in phase as depicted by the dashed line as a low-frequency component thereof, while taking the voltage value of one of the four stages of a voltage value from the above "0" to the maximum value, as illustrated in a lower portion in FIG. 4. The difference voltage ($V_{r1}-V_{r2}$) based on this phase difference is applied to the AC inductor 3, and thereby current $I_L$ flows, and this current $I_L$ will eventually have a waveform similar to that of voltage $V_{r1}$.

As an example, the control operation of the circuit unit 10 performed by the control unit 20 may be similar to the control operation performed by the configuration in FIG. 3 of Patent Document 1 except that one of the inputs of the adder-subtractor 23 is not current $I_L$ but current $i_s$; however the scope of the present invention is not limited to this example.

As a result of giving a phase difference to each of carriers a, b and c as described above, a frequency appearing in voltage $V_{r2}$ in response to the switching of the entire device becomes three times as high as the carrier frequency, and the voltage of this frequency is applied to the AC inductor 3 of the DC circuit.

Also, the width of a change in voltage $V_{r2}$ that occurs accompanying the switching becomes ⅓ of that of the conventional configuration, and accordingly even when the inductance value of the AC inductor 3 is reduced so as to reduce the size, ripples contained in current $I_L$ can be sufficiently suppressed.

As described above, even when the inductance value of the AC inductor 3 is reduced so as to reduce the size, the present method inputs to ACR a deviation between instantaneous value command $I_L^*$ of current $I_L$ and current $i_s$ in the manner described above, and thereby can prevent the current control from becoming unstable.

Note that the above control unit 20 may be configured of an arithmetic processor (not illustrated) such as for example a CPU etc., and in such a case, the arithmetic processor can implement the various types of the above configurations/functions illustrated in FIG. 2 by executing a prescribed program that is stored in advance.

The functions illustrated in FIG. 3 are as described below.

Figure 5:
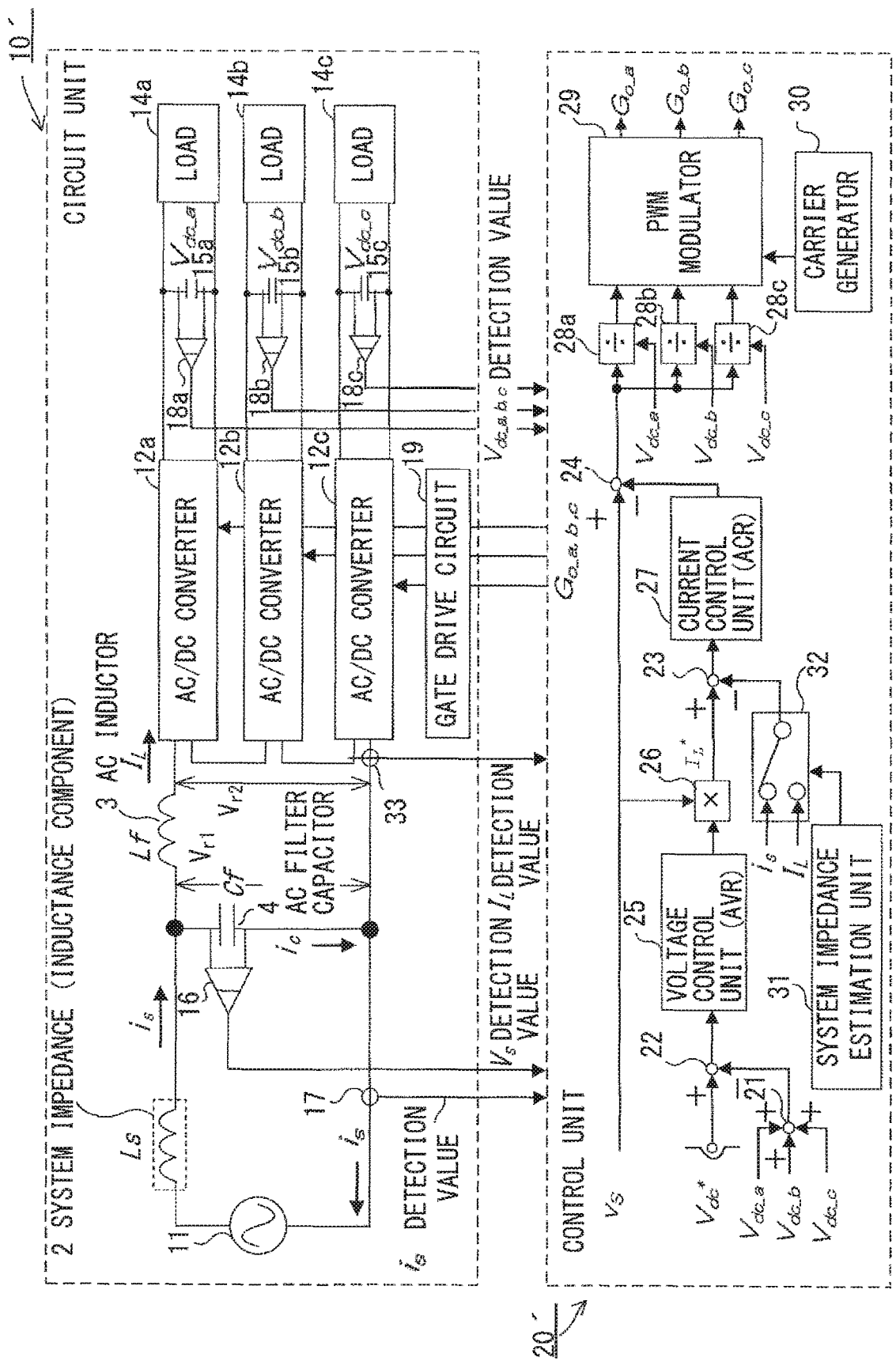
FIG. 5 illustrates a configuration example of an AC-DC conversion device according to example 2.

(1) Converting AC input voltage $V_{in}$ into DC output voltage E(=Vdc_a+Vdc_b+Vdc_c) of a desired level and maintaining this DC output voltage E at a constant level regardless of variations in AC input voltage $V_{in}$ or a load current (2) Changing AC input current $I_{in}$ to a sinusoidal waveform roughly of a unity power factor FIG. 5 illustrates a configuration example of an AC-DC conversion device of example 2.

The configuration illustrated in FIG. 5 includes a circuit unit 10' and a control unit 20'.

In the configuration illustrated in FIG. 5, the constituents of the circuit unit 10' may be basically similar to those of the circuit unit 10 of example 1 illustrated in FIG. 2 and are denoted by the same symbols, and explanations thereof will be omitted. However, the circuit unit 10' is different from the circuit unit 10 illustrated in FIG. 2 in that an ammeter 33 that measures the value of current $I_L$ above is further provided. Also, the control unit 20' has a configuration that is obtained by adding the system impedance estimation unit 31 and a selection output unit 32 (illustrated) to the configuration of the control unit 20 illustrated in FIG. 2.

The measurement value of current $I_L$ obtained by the ammeter 33 is input to the control unit 20 and serves as one of the inputs of the selection output unit 32. As the other input of the selection output unit 32, the measurement value of current $i_s$ obtained by the ammeter 17 is input. In accordance with an output of the system impedance estimation unit 31, the selection output unit 32 outputs, to the adder-subtractor 23, one of the two inputs (the measurement value of currents $I_L$ and the measurement value of current $i_s$).

In example 1 above, one of the inputs of the adder-subtractor 23 is always the measurement value of current $i_s$. In example 2, by contrast, one of the inputs of the adder-subtractor 23 becomes one of the measurement value of current $I_L$ and the measurement value of current $i_s$ depending upon the situation. As an example, it is assumed that the output of the system impedance estimation unit 31 is "1" or "0" and that the selection output unit 32 outputs the measurement value of current $I_L$ when the output of the system impedance estimation unit 31 is "1", and outputs the measurement value of current $i_s$ when the output of the system impedance estimation unit 31 is "0". As a matter of course, this is an example, and the scope of the present invention is not limited to this example.

The system impedance estimation unit 31 inputs voltage Vs applied to the AC filter capacitor 4, and estimates, on the basis of this, the value of Ls of the system impedance 2 by using an existing technique. While an example of the existing technique is the method disclosed by Japanese Laid-open Patent Publication No. 2007-124816, the scope of the present invention is not limited to this example. However, the scope of the present invention is not limited to this example. The system impedance estimation unit 31 may be omitted, and in such a case, it is possible to employ a configuration in which the developer etc. of the device calculates in advance the value of Ls of the system impedance 2 by using an existing method and this value of Ls is stored in the control unit 20' in advance.

Hereinafter, brief explanations will be given for the existing technique of obtaining a system impedance according to Japanese Laid-open Patent Publication No. 2007-124816.

First, voltage Vs applied to the AC filter capacitor 4 is converted into orthogonal biaxial components $v_\alpha$ and $v_\beta$ in a rest frame. Then, on the basis of these biaxial components $v_\alpha$ and $v_\beta$, input voltage vector Vi is calculated by using Equation (1) below.

$$V_i = \sqrt{v_\alpha^2 + v_\beta^2} \qquad \text{Equation (1)}$$

Obtained input voltage vector Vi is stored for a certain period of time and receives a discrete Fourier transform at intervals of a prescribed detection sampling, and the frequency and the amplitude of a harmonic component included in the input voltage are obtained. In this example, the discrete Fourier transform is an arithmetic operation of obtaining the amplitude and the frequency of an input signal by developing data into Fourier series, the data being sampled for a certain period of time in order to measure the frequency of the input signal, and detailed explanations thereof will be omitted because the contents thereof are known.

On the basis of the information of the amplitude and the frequency obtained by the above discrete Fourier transform, a frequency that leads to a maximum amplitude is extracted as resonance frequency fs between a fundamental wave frequency and a resonance frequency of the input filter (the AC inductor 3 and the AC filter capacitor 4) in a state in which the system impedance is not included.

Thereafter, it is assumed that $\omega s = 2\pi f s$ is satisfied and that the capacity of the AC filter capacitor 4 is Cf, and system inductance Ls can be obtained from Equation (2) below.

$$L_s = \frac{1}{\omega_s^2 C_f} - L_f \qquad \text{Equation (2)}$$

The system impedance estimation unit 31 further compares an estimation value of Ls of the system impedance 2 and the value of Lf of the AC inductor 3 that is set in advance, and outputs "1" when Ls is smaller than Lf (Ls<Lf), and thereby makes the selection output unit 32 output the measurement value of current $I_L$. When Ls is equal to or greater than Lf (Ls≥Lf), the system impedance estimation unit 31 outputs "0" and thereby makes the selection output unit 32 output the measurement value of current $i_s$.

As described above, in example 2, the value of current $I_L$ is used as one of the inputs of the adder-subtractor 23 when Ls<Lf is satisfied and the value of current $i_s$ is used as one of the inputs of the adder-subtractor 23 when Ls≥Lf is satisfied. In example 1, while it is assumed that a small Lf means that Ls is greater than Lf, this assumption is not true for all situations. Depending upon the state of a power system to which the present device is connected, even when Lf is small, Ls can be even smaller (Ls<Lf). In a situation where Ls<Lf is satisfied such as this, even when Lf is small, current control can be performed more stably by using current $I_L$ than by using current $i_s$ (this is because the frequency of a high-frequency component in a system voltage becomes closer to the resonance frequency of Lf and Cf when Ls is small, and this increases the high-frequency component, or for other reasons).

From the above, in example 2, when Ls<Lf is satisfied, the adder-subtractor 23 obtains a deviation between instantaneous value command $I_L^*$ of current $I_L$ and the value of current $I_L$, and this deviation is input to the current control unit 27 (ACR). When Ls≥Lf is satisfied, the adder-subtractor 23 obtains a deviation between instantaneous value command $I_L^*$ of current $I_L$ and the value of current $i_s$, and this deviation is input to the current control unit 27 (ACR). Thereby, it is possible to perform current control by using an appropriate value in accordance with the state of the system impedance and thereby to perform current control stably.

FIG. 6 illustrates a configuration example of an AC-DC conversion device according to example 3.

The configuration illustrated in FIG. 6 includes a circuit unit 10" and a control unit 20".

In the configuration illustrated in FIG. 6, the constituents of the circuit unit 10" may be essentially similar to those of the circuit unit 10 of example 1 illustrated in FIG. 2 and are denoted by the same symbols, and explanations thereof will be omitted. However the circuit unit 10" is different from the circuit unit 10 illustrated in FIG. 2 in that the configuration of FIG. 6 is not provided with the ammeter 17 (for measuring current $i_s$) of FIG. 2 but is provided with the ammeter 33 that measures the value of current $I_L$ and an ammeter 34 that measures the value of current $i_c$ of the AC filter capacitor 4.

The measurement value of current $I_L$ and the measurement value of current $i_c$ are input to the control unit 20".

Also, the control unit 20" has a configuration that is obtained by adding an adder 35 (illustrated) to the configuration of the control unit 20 illustrated in FIG. 2. One of the inputs of the adder 35 is the measurement value of current $I_L$, the other input is the measurement value of current $i_c$, and an output obtained by adding these two input values (equivalent to the value of current $i_s$) serves as one of the inputs of the adder-subtractor 23.

In example 1, one of the inputs of the adder-subtractor 23 is always the measurement value of current $i_s$. In example 3, by contrast, one of the inputs of the adder-subtractor 23 is always the value of current $i_s$ (not measured). In example 3, the ammeter 17 of example 1 above (an ammeter that measures the value of current $i_s$) is not provided. Instead, the ammeter 33 and the ammeter 34 are provided.

In this example, it is possible to consider that $i_s=I_L+i_c$ is satisfied.

Thereby, it is possible to consider that a result of adding the measurement value of current $I_L$ and the measurement value of current $i_c$ obtained by the adder 35 is the value of current $i_s$. Thereby, in the configuration of example 3, similarly to example 1, one of the inputs of the adder-subtractor 23 is the value of current $i_s$. As described above, it is not always necessary to measure the value of current $i_s$.

FIG. 7 illustrates a configuration example of an AC-DC conversion device according to example 4.

The configuration illustrated in FIG. 7 includes a circuit unit 10* and a control unit 20*.

In the configuration illustrated in FIG. 7, the constituents of the circuit unit 10* may be similar to those of the circuit unit 10" illustrated in FIG. 6 and are denoted by the same symbols, and explanations thereof will be omitted. Thereby, to the control unit 20* illustrated in FIG. 7, the measurement value of current $I_L$, and the measurement value of current $i_c$ are input together with the measurement value of Vs.

Also, the control unit 20* has a configuration that is obtained by adding the system impedance estimation unit 31, a selection output unit 36, and an adder 37 (illustrated) to the configuration of the control unit 20 illustrated in FIG. 2.

The constituents of the system impedance estimation unit 31 itself are similar to those of the system impedance estimation unit 31 illustrated in FIG. 5 and are denoted by the same symbols, and explanations thereof will be omitted. However, an output of the system impedance estimation unit 31 is input to the selection output unit 36 in FIG. 7, and the configuration of FIG. 7 is different from that of FIG. 5 on this point.

The selection output unit 36 has input the measurement value of current $i_c$ and a prescribed fixed value ("0" in this example), and selectively outputs one of these two inputs in accordance with an output value of the system impedance estimation unit 31.

The adder 37 has input an output of the selection output unit 36 and the measurement value of current $I_L$, and inputs the total value (result of adding) these two input values to the adder-subtractor 23.

When the output of the selection output unit 36 is "0", the adder 37 inputs the measurement value of current $I_L$ to the adder-subtractor 23. When the output of the selection output unit 36 is the measurement value of current $i_c$, the adder 37 inputs "$I_L+i_c=i_s$" to the adder-subtractor 23. As described above, the adder 37 substantially inputs one of $I_L$ and $i_s$ to the adder-subtractor 23.

Then, as described in FIG. 5, the system impedance estimation unit 31 estimates the value of Ls of the system impedance 2, outputs "1" when Ls is smaller than Lf (Ls<Lf), and outputs "0" when Ls is equal to or greater than Lf (Ls≥Lf). The selection output unit 36 outputs above fixed value "0" when the output value of the system impedance estimation unit 31 is "1" and thereby makes the adder 37 output the measurement value of current $I_L$ to the adder-subtractor 23. When the output value of the system impedance estimation unit 31 is "0", the selection output unit 36 outputs the measurement value of current $i_c$ and thereby makes the adder 37 output the current $i_s$ value to the adder-subtractor 23.

As described above, the configuration illustrated in FIG. 7 is similar to example 2 (FIG. 5) in that when one of the inputs of the adder-subtractor 23 satisfies "Ls<Lf", $I_L$ is output, and when one of the inputs of the adder-subtractor 23 satisfies "Ls≥L", $i_s$ is output.

As described above, it is assumed that each of the power conversion devices (AC-DC conversion devices) according to the present invention is a power conversion device basically having a configuration including an inductor and a capacitor constituting an input LC filter for an input from an AC source and also including switching units to which an input current is input from the AC source via the inductor and which generate/output a DC output voltage, wherein the plurality of switching units are connected in series and output the DC output voltage to loads that are connected to the switching units themselves.

According to the power conversion devices etc. of the present invention, it is possible to prevent input current control from becoming unstable even when the inductance value of an inductor is decreased in a power conversion device having a multi-level circuit and an input LC filter.

Also, each power conversion device of the present invention further includes the constituents below for example.

The first power conversion device of the present invention has the constituents/functions (not illustrated) described below.

The switching units respectively have switching elements, and the switching elements are connected in series. They further include control devices that perform ON/OFF control on the respective switching elements and first-current measurement units that measure a first-current measurement value, which is a value of a current flowing through a system from the AC source to the capacitor. Also, the control device performs ON/OFF control on the semiconductor switching elements on the basis of the first-current measurement value.

It is also possible to consider that for example the control device in the first power conversion device has the function units (not illustrated) described below.

A first deviation calculation function unit that obtains a deviation between a total value of DC output voltages to the loads and a command value for that total value A voltage control function unit that generates/outputs, in accordance with an output from the first deviation calculation function unit, an amplitude command value of a second current, which is a current flowing through the inductor A multiplier that generates/outputs an instantaneous value command of the second current in accordance with the amplitude command value of the second current A PWM control function unit that performs PWM control on the basis of a deviation between the instantaneous value command of the second current and the first-current measurement value so as to generate an ON/OFF control signal of the respective semiconductor switching elements The second power conversion device of the present invention has the constituents/functions (not illustrated) described below.

The switching units respectively have switching elements, and the switching elements are connected in series. They further include control devices that perform ON/OFF control on the respective switching elements, first-current measurement units that measure a first-current measurement value, which is a value of a current flowing through a system from the AC source to the capacitor, and second-current measurement units that measure a second-current measurement value, which is a value of a current flowing through the inductor.

Also, the control device performs ON/OFF control on the semiconductor switching elements by using one of the first and second-current measurement values.

Also, in the second power conversion device, the control device for example includes a system impedance estimation unit (not illustrated) that estimates the value of an inductance component of a system from the AC source to the capacitor, and performs ON/OFF control on the above semiconductor switching elements by using the second-current measurement value when the value of the inductance component of the system is lower than the inductance value of the inductor that is set in advance.

The third power conversion device of the present invention has the constituents/functions (not illustrated) described below.

The switching units respectively have switching elements, and the switching elements are connected in series. They further include control devices that perform ON/OFF control on the respective switching elements, second-current measurement units that measure a second-current measurement value, which is a value of a current flowing through the inductor, and third-current measurement units that measure a third-current measurement value, which is a value of a current flowing through the capacitor. Also, the control device performs ON/OFF control on the respective semiconductor switching elements on the basis of a total value of the second-current measurement value and the third-current measurement value.

The fourth power conversion device of the present invention has the constituents/functions (not illustrated) described below.

The switching units respectively have switching elements, and the switching elements are connected in series. They further include control devices that perform ON/OFF control on the respective switching elements, second-current measurement units that measure a second-current measurement value, which is a value of a current flowing through the inductor, and third-current measurement units that measure a third-current measurement value, which is a value of a current flowing through the capacitor.

Also, the control device includes a system impedance estimation unit that estimates a value of an inductance component of a system from the AC source to the capacitor, performs ON/OFF control on the semiconductor switching elements by using the second-current measurement value when the value of the inductance component of the system is lower than a prescribed inductance value of the inductor, and performs ON/OFF control on each of the semiconductor switching elements on the basis of a total value of the second-current measurement value and the third-current measurement value when the value of the inductance component of the system is equal to or higher than the inductance value of the inductor.

Also, in any of the first, second, third and fourth power conversion devices, the control device controls the DC output voltage by for example performing pulse-width modulation control on the semiconductor switching elements.

Alternatively, it is possible to consider that the power conversion devices of the present invention have the following constituents.

The power conversion devices of the present invention have the constituents/functions (not illustrated) described below.

A plurality of switching units that are connected in series between a positive terminal and a negative terminal of an AC source and that output, to loads, an input current that is from the AC source and a DC output voltage that is generated through ON/OFF control of semiconductor switching elements, the loads being connected to the respective switching units A capacitor that is connected in parallel between the AC source and the plurality of switching units An inductor that is inserted at a position and that constitutes an input filter together with the capacitor, the position being between the capacitor and the plurality of switching units and between the AC source and the plurality of switching units A first-current measurement unit that measures a first-current measurement value, which is a value of a current flowing through a system from the AC source to the capacitor A control device that performs ON/OFF control on the respective semiconductor switching elements on the basis of the first-current measurement value Another power conversion device according to the present invention has the constituents/functions (not illustrated) described below.

A plurality of switching units that are connected in series between a positive terminal and a negative terminal of an AC source and that output, to loads, an input current that is from the AC source and a DC output voltage that is generated through ON/OFF control of semiconductor switching elements, the loads being connected to the respective switching units A capacitor that is connected in parallel between the AC source and the plurality of switching units An inductor that is inserted at a position and that constitutes an input filter together with the capacitor, the position being between the capacitor and the plurality of switching units and between the AC source and the plurality of switching units A first-current measurement unit that measures a first-current measurement value, which is a value of a current flowing through a system from the AC source to the capacitor A second-current measurement unit that measures a second-current measurement value, which is a value of a current flowing through the inductor A control device that performs ON/OFF control on each of the semiconductor switching elements on the basis of one of the first-current measurement value and the second-current measurement value Still another power conversion device according to the present invention has the constituents/functions (not illustrated) described below.

A plurality of switching units that are connected in series between a positive terminal and a negative terminal of an AC source and that output, to loads, an input current that is from the AC source and a DC output voltage that is generated through ON/OFF control of semiconductor switching elements, the loads being connected to the respective switching units A capacitor that is connected in parallel between the AC source and the plurality of switching units An inductor that is inserted at a position and that constitutes an input filter together with the capacitor, the position being between the capacitor and the plurality of switching units and between the AC source and the plurality of switching units A first-current measurement unit that measures a first-current measurement value, which is a value of a current flowing through a system from the AC source to the capacitor A second-current measurement unit that measures a second-current measurement value, which is a value of a current flowing through the inductor A third-current measurement unit that measures a third-current measurement value, which is a value of a current flowing through the capacitor A control device that performs ON/OFF control on each of the semiconductor switching elements on the basis of the second-current measurement value and the third-current measurement value Another power conversion device of the present invention has the constituents/functions (not illustrated) described below.

A plurality of switching units that are connected in series between a positive terminal and a negative terminal of an AC source and that output, to loads, an input current that is from the AC source and a DC output voltage that is generated through ON/OFF control of semiconductor switching elements, the loads being connected to the respective switching units A capacitor that is connected in parallel between the AC source and the plurality of switching units An inductor that is inserted at a position and that constitutes an input filter together with the capacitor, the position being between the capacitor and the plurality of switching units and between the AC source and the plurality of switching units A first-current measurement unit that measures a first-current measurement value, which is a value of a current flowing through a system from the AC source to the capacitor A second-current measurement unit that measures a second-current measurement value, which is a value of a current flowing through the inductor A third-current measurement unit that measures a third-current measurement value, which is a value of a current flowing through the capacitor A control device that has a system impedance estimation unit configured to estimate a value of an inductance component of a system from the AC source to the capacitor, that performs ON/OFF control on the semiconductor switching elements by using the second-current measurement value when the value of the inductance component of the system is lower than a prescribed inductance value of the inductor, and that performs ON/OFF control on each of the semiconductor switching elements on the basis of the second-current measurement value and the third-current measurement value when the value of the inductance component of the system is equal to or higher than the inductance value of the inductor As described above, according to the power conversion devices (AC-DC conversion devices) of the present invention, it is possible to prevent input current control from becoming unstable even when the inductance value of an inductor is decreased in a power conversion device having a multi-level circuit and an LC filter.

What is claimed is:

1. A power conversion device comprising:
    an alternating current (AC) source having a positive terminal and a negative terminal;
    a plurality of switching units that are connected in series between the positive terminal and the negative terminal of the AC source, each switching unit including a semiconductor switching element and having a load connected thereto, each switching unit outputting, to the load connected thereto, an input current that is from the AC source and a direct current (DC) output voltage that is generated through ON/OFF control of the semiconductor switching elements of the switching units;
    a capacitor that is connected in parallel with the AC source and with the plurality of switching units;
    an inductor that is inserted between the capacitor and the plurality of switching units, and between the AC source and the plurality of switching units, the inductor and the capacitor constituting an input filter;
    a current measurement unit that measures a value of a current flowing from the AC source to the capacitor; and
    a control device that performs the ON/OFF control on the semiconductor switching elements, by calculating a difference between an instantaneous value command and the measured current value, and thereby generating an ON/OFF control signal for each of the semiconductor switching elements.

2. The power conversion device according to claim 1, wherein
    the control device controls the DC output voltages by performing pulse-width modulation control on the semiconductor switching elements.

3. The power conversion device according to claim 1, wherein
    the control device includes:
        a first deviation calculation unit that obtains a difference between a total value of the DC output voltages outputted to the loads and a predetermined command value;
        a voltage control unit that generates and outputs an amplitude command value in accordance with the difference obtained by the first deviation calculation unit;
        a multiplier that generates and outputs the instantaneous value command in accordance with the amplitude command value; and
        a pulse-width modulation (PWM) control unit that performs PWM control by calculating the difference between the instantaneous value command and the measured current value, and thereby generating the ON/OFF control signal for each of the semiconductor switching elements.

4. The power conversion device according to claim 3, wherein
    the control device controls the DC output voltages by performing pulse-width modulation control on the semiconductor switching elements.

5. A power conversion device comprising:
    an alternating current (AC) source having a positive terminal and a negative terminal;
    a plurality of switching units that are connected in series between the positive terminal and the negative terminal of the AC source, each switching unit including a semiconductor switching element and having a load connected thereto, each switching unit outputting, to the load connected thereto, an input current that is from the AC source and a direct current (DC) output voltage that is generated through ON/OFF control of the semiconductor switching elements of the switching units;

a capacitor that is connected in parallel with the AC source and with the plurality of switching units;

an inductor that is inserted between the capacitor and the plurality of switching units, and between the AC source and the plurality of switching units, the inductor and the capacitor constituting an input filter;

a first-current measurement unit that measures a first-current measurement value, which is a value of a current flowing from the AC source to the capacitor;

a second-current measurement unit that measures a second-current measurement value, which is a value of a current flowing through the inductor; and a control device that performs the ON/OFF control on each of the semiconductor switching elements, by using the second-current measurement value when an estimated system impedance value is lower than a prescribed inductance value of the inductor.

6. The power conversion device according to claim 5, wherein
the control device controls the DC output voltages by performing pulse-width modulation control on the semiconductor switching elements.

7. The power conversion device according to claim 5, wherein
the control device further includes a system impedance estimation unit that obtains, by estimation, the estimated system impedance value, which is a value of an inductance component of an electrical connection between the AC source and the capacitor.

8. The power conversion device according to claim 7, wherein
the control device controls the DC output voltages by performing pulse-width modulation control on the semiconductor switching elements.

9. A power conversion device comprising:
an alternating current (AC) source having a positive terminal and a negative terminal;

a plurality of switching units that are connected in series between the positive terminal and the negative terminal of the AC source, each switching unit including a semiconductor switching element and having a load connected thereto, each switching unit outputting, to the load connected thereto, an input current that is from the AC source and a direct current (DC) output voltage that is generated through ON/OFF control of the semiconductor switching elements of the switching units;

a capacitor that is connected in parallel with the AC source and with the plurality of switching units;

an inductor that is inserted between the capacitor and the plurality of switching units, and between the AC source and the plurality of switching units, the inductor and the capacitor constituting an input filter;

a first-current measurement unit that measures a first-current measurement value, which is a value of a current flowing from the AC source to the capacitor;

a second-current measurement unit that measures a second-current measurement value, which is a value of a current flowing through the inductor;

a third-current measurement unit that measures a third-current measurement value, which is a value of a current flowing through the capacitor; and a control device that performs the ON/OFF control on each of the semiconductor switching elements using the second-current measurement value and the third-current measurement value when an estimated system impedance value is equal to or higher than a prescribed inductance value of the inductor.

10. The power conversion device according to claim 9, wherein
the control device controls the DC output voltages by performing pulse-width modulation control on the semiconductor switching elements.

11. A power conversion device comprising:
an alternating current (AC) source having a positive terminal and a negative terminal;

a plurality of switching units that are connected in series between the positive terminal and the negative terminal of the AC source, each switching unit including a semiconductor switching element and having a load connected thereto, each switching unit outputting, to the load connected thereto, an input current that is from the AC source and a direct current (DC) output voltage that is generated through ON/OFF control of the semiconductor switching elements of the switching units;

a capacitor that is connected in parallel with the AC source and with the plurality of switching units;

an inductor that is inserted between the capacitor and the plurality of switching units, and between the AC source and the plurality of switching units, the inductor and the capacitor constituting an input filter;

a first-current measurement unit that measures a first-current measurement value, which is a value of a current flowing from the AC source to the capacitor;

a second-current measurement unit that measures a second-current measurement value, which is a value of a current flowing through the inductor;

a third-current measurement unit that measures a third-current measurement value, which is a value of a current flowing through the capacitor; and a control device
that has a system impedance estimation unit configured to estimate a system impedance value, which is a value of an inductance component of an electrical connection between the AC source and the capacitor, that performs the ON/OFF control on the semiconductor switching elements by using the second-current measurement value when the system impedance value is lower than a prescribed inductance value of the inductor, and that performs the ON/OFF control on each of the semiconductor switching elements on the basis of the second-current measurement value and the third-current measurement value when the system impedance value is equal to or higher than the prescribed inductance value of the inductor.

12. The power conversion device according to claim 11, wherein
the control device controls the DC output voltages by performing pulse-width modulation control on the semiconductor switching elements.

* * * * *